(No Model.) 2 Sheets—Sheet 1.

J. L. DYKES.
SEED PLANTER AND CULTIVATOR.

No. 392,148. Patented Oct. 30, 1888.

ATTEST.
Victor J. Evans
James S. Smith

INVENTOR
James L. Dykes
By W. A. Redmond,
Att'y.

N. PETERS, Photo-Lithographer, Washington, D. C.

(No Model.) 2 Sheets—Sheet 2.

J. L. DYKES.
SEED PLANTER AND CULTIVATOR.

No. 392,148. Patented Oct. 30, 1888.

ATTEST.
Victor J. Evans.
James S. Smith.

INVENTOR.
James L. Dykes.
By W. A. Redmond,
Atty.

N. PETERS, Photo-Lithographer, Washington, D. C.

UNITED STATES PATENT OFFICE.

JAMES LAFAYETT DYKES, OF UNIONTOWN, ALABAMA.

SEED-PLANTER AND CULTIVATOR.

SPECIFICATION forming part of Letters Patent No. 392,148, dated October 30, 1888.

Application filed May 15, 1888. Serial No. 273,920. (No model.)

*To all whom it may concern:*

Be it known that I, JAMES LAFAYETT DYKES, a citizen of the United States, residing at Uniontown, in the county of Perry and State of Alabama, have invented certain new and useful Improvements in Combined Seed-Planter and Cultivator; and I do hereby declare the following to be a full, clear, and exact description of the invention, such as will enable others skilled in the art to which it appertains to make and use the same.

This invention relates to a combined seed-planter and cultivator; and it has for its object to provide a simple and durable machine of the class named which may be used to open the furrow, drop the seed, and cover the same, as well as cultivate the land at the same time; or it may be used simply as a planter or as a cultivator, as desired, and which will leave the bed or drill in a neat oval shape; and it consists of the parts and combinations of parts hereinafter described and claimed.

Figure 1:
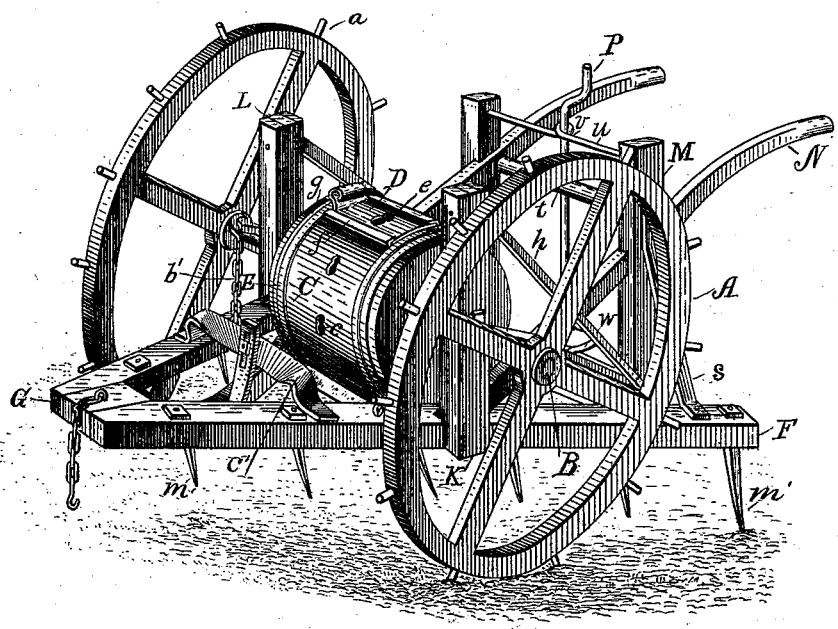
Figures 2, 3:
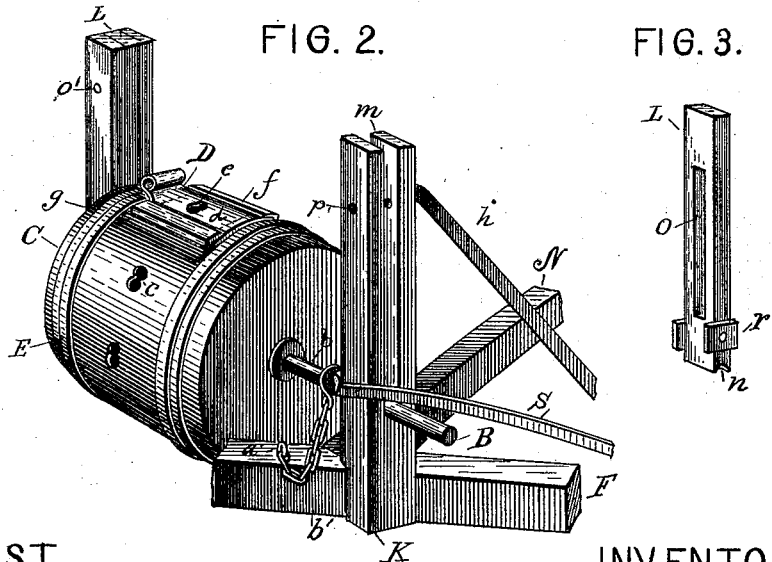
Figure 4:
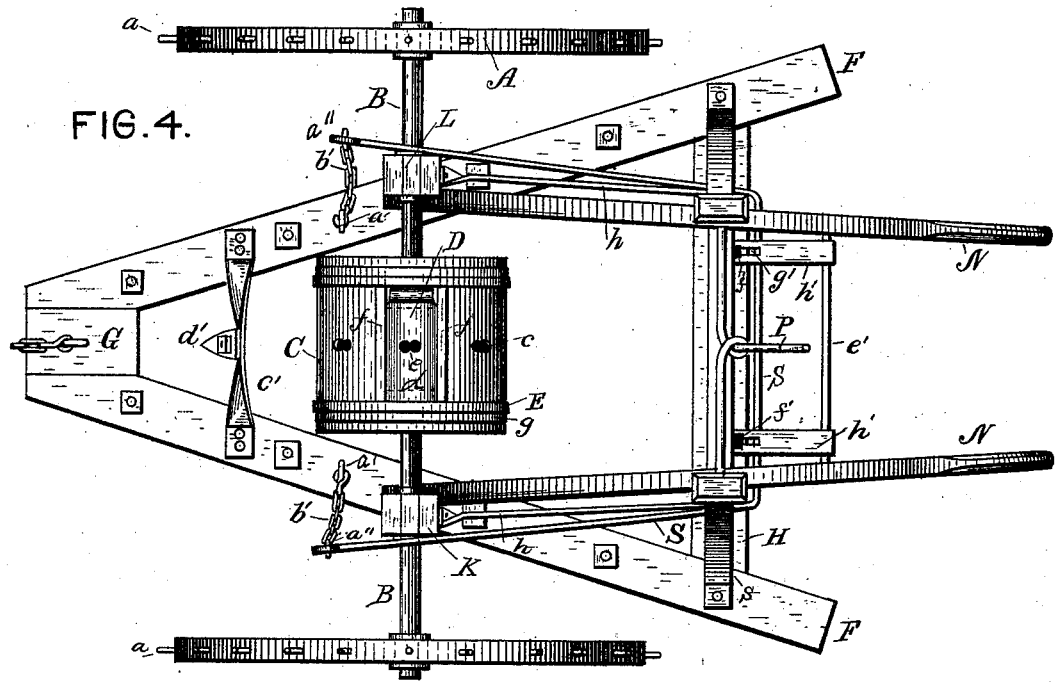

In the accompanying drawings, forming a part of this specification, Figure 1 is a perspective view of my improved machine; Fig. 2, a detail perspective view of a part of the machine; Fig. 3, a detail perspective of the movable part of the axle-bearing; Fig. 4, a plan view of the machine, and Fig. 5 a rear elevation of the same.

Similar letters refer to similar parts throughout the several views.

A represents the wheels of my improved machine, and B the axle or shaft on which they are journaled so as to revolve with it. On the peripheries of the wheels small iron pegs or projections a are formed or secured, for the purpose of enabling the wheels to more readily grasp the earth, although, if desired, the peripheries may be cast with grooves or ridges for the same purpose. The central part of the axle is made square, as indicated at b, and on this part a seed-drum, C, is secured so as to rotate with said axle. The drum is of any desired size, and has a series of oblong openings, c, formed therein around its center, and a large square opening, d, as indicated by dotted lines in Figs. 2 and 4, through which the seed may be placed in the drum, and which is to be covered by a sliding door, D, having an oblong opening, e, formed therein to correspond to the openings c of the drum. The door slides into place on the drum under the flanges f, formed on the band E, surrounding the body of the drum, which is also provided with a series of openings corresponding in size and shape to the openings c of the drum. The band E is retained in place by the flanges or collars g, formed on or secured to the drum near its ends, which overlap the edges of the band, but permit its being readily moved or adjusted about the drum, for the purpose of increasing or decreasing the size of the openings in the drum to accommodate the different sizes of seeds to be planted.

F represents the longitudinal or side beams, and G the front and H the rear beams, of the frame of the cultivator or harrow. The side beams converge toward the front end of the machine, forming a V-shaped frame, in about the center of which the drum C is located. To the side beams, F, the lower ends of uprights K are secured and braced firmly by the brace-rods h, which extend from the standard M on the rear cross-beam to the upper ends of the uprights. These uprights are slotted vertically, as clearly shown at m, Fig. 2, to receive the axle B and the bearing or following bars L, the latter having concave grooves n at one end and slots o formed in their bodies, said slots being, when the bars are in position in the uprights, at right angles to the slots m. A pin, o', is inserted in perforations p, formed in the uprights near their upper ends, passing through the slots o, and thus preventing the bars L from rising completely out of the slotted uprights K, while blocks r, secured to said bars near their lower ends, guide them in their movement, thus permitting the rise and fall of the harrow independent of the seeding or planting device.

Upright standards M are secured on the rear cross-beam, H, on each side of the machine, which are braced by rods s from the side beams and by a cross-bar, t, connecting said standards near their upper ends. To the inner sides of these standards, and to the side beams, F, near their center, the handles N are secured, by which the machine is guided. A rod, u, which is also secured at its ends to the standards M, having a link or ring, v, formed in it at its center, serves as a support for the upper end of a lever, P, the lower end of which is suitably pivoted in a step-block, R, secured to the rear beam, H, as clearly shown in Fig. 5. This lever is bent at right angles to form a crank, w, for a purpose which will be hereinafter described.

To hooks or eyebolts a', secured to the side beams immediately in front of the axle B, the ends of chains b' are secured, the other ends of said chains being connected to the ends a'' of a two-armed or double lever, S, which extends back over the axle outside of the uprights K and standards M to the rear of the machine. The object of this construction is to raise the harrow from the ground in going to or from the field, and also to keep the same clear of the ground when it is desired to plant only and not cultivate, this being accomplished by simply pressing the rear end of the double lever S down and raising the harrow up off the ground, using the axle as a fulcrum for the lever by the chains and turning the lever P until its crank w overlaps the rear end of said double lever to hold it in that position.

A bar, c', is secured to the side beams, F, immediately in front of the drum C, and to this bar an opener-tooth, d', is adjustably secured by a set-screw or bolt passing through a slot in said tooth into a perforation formed in the bar c'. The tooth d' is flat and is pointed at one end, and curves forward from the bar and opens a furrow directly in line with the series of openings c, formed in the drum. To the rear beam, H, a scraper or coverer, e', is adjustably secured by screws or bolts f', passing through slots g', formed in the bars h', secured to said coverer e', so that said coverer may be adjusted to or from the drum, as desired. The lower edge of the coverer is curved, as shown in Fig. 5, to conform to the shape of the bed in which the seed is being planted.

Figure 5:
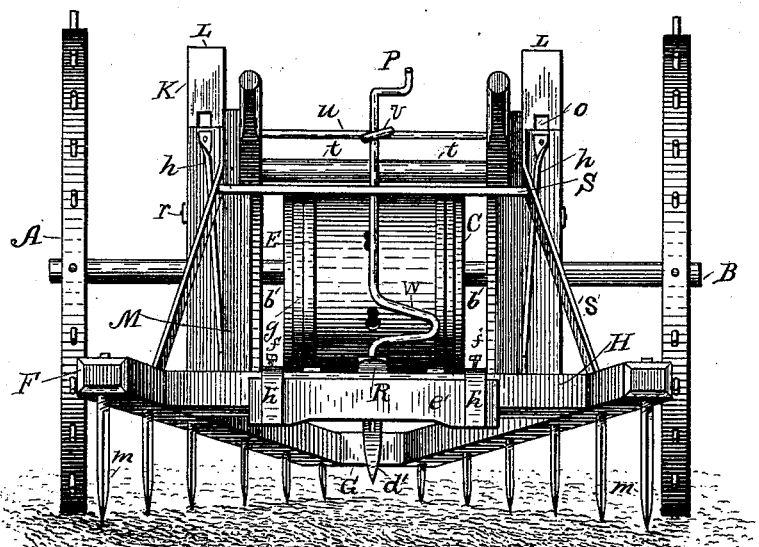

The teeth m' of the harrow, as shown in Figs. 1 and 5, are not all of the same size, but increase in size or length toward the rear end of the machine. Thus I employ twelve teeth. Preferably the first six teeth from the front— three on each side—are three inches in the clear, the next two—one on each side—four inches in the clear, the next two six inches in the clear, and the next and last two nine inches in the clear. The object of this arrangement of the teeth is to cultivate the beds or drills thoroughly, and at the same time leave them in a neat oval or rounded shape, this resulting from the fact that the V-shaped frame of the harrow carries the shorter teeth at the forward or narrow end, where they will come in contact with the highest part of the bed, and as the frame widens toward the rear the increase in length of the teeth is necessary, as they have farther to reach in order to penetrate the sides of the bed, and thus perform the work neatly and uniformly throughout. The teeth are screw-threaded and are held to the frame by nuts, so that they may be readily removed for repair or for the purpose of substituting small plows.

Thus it will be seen that my machine will open the furrow, drop the seed and cover the same, and cultivate the land at the same time, and may also be used as a cultivator after planting; will plant on a level bed or drill and not tear down the same, but leave it in neat oval shape; will adjust itself to any height of bed or drill, as its frame may freely rise and fall, owing to the slotted uprights working up and down on the axle, thus rendering the planting mechanism independent of the cultivating, and that the harrow may be lifted clear from the ground at any time for any purpose.

Having thus described my invention, what I claim as new, and desire to secure by Letters Patent, is—

1. The combination, in a combined planter and harrow, of the wheels, the axle, a suitable seed-drum secured to said axle, the V-shaped harrow-frame provided with suitable teeth, the slotted uprights secured to said frame, the bearing-bars having the slots at right angles to the slots of the uprights, a pin passing through said uprights and the bearing-bars, the standards M, the bar having the link or ring formed therein, the hand-lever P, having a crank near its lower end, the double-armed lever S, and the chains b', attached to said arms and to the harrow-frame, whereby said harrow-frame is movable independent of said drum, substantially as described.

2. The combination, in a combined seed-planter and harrow, of the axle B, the wheels rigidly secured to said axle, the drum having a series of openings formed in its body rigidly secured to said axle, the flanges g, secured to said drum, the band E, having a series of openings corresponding to the drum-openings working under said flanges and adjustable about or around said drum, the flanges f, formed on said band, and the door having an opening working in flanges f, substantially as described.

3. The combination, in a combined seed-planter and harrow, of the V-shaped frame, the teeth m', the slotted uprights secured to said frame, the axle having its bearing in said uprights, the slotted bearing-bars having the concaved groove in one end and slots formed in their sides, the guide-blocks secured to said bearing-bars, the standards M, the bars u, having the ring v formed therein, the vertical lever P, having the crank formed near its lower end, the double-armed lever, and the chains connecting said lever to the frame, substantially as described.

4. The combination, in a seed-planter and harrow, of the adjustable V-shaped harrow-frame having a series of removable teeth increasing in length toward the rear end of the frame, substantially as described.

5. The hereinbefore-described combined seed-planter and harrow, consisting of the toothed wheels, the axle, the drum having a series of oval openings formed in its body secured to said axle, the band E, having corresponding openings adjustable about said drum, the door provided with an opening working between flanges formed on said band, the V-shaped frame having the removable teeth, the slotted uprights secured to said frame, the bearing-bars having concaved ends and slots formed in its body working in said slotted uprights, guide-blocks secured to said bars, pins passing through said uprights and bars, the standards secured to the rear bar of the frame, the handles secured to said standards and frame, the bar having the link or ring, the hand-lever having a crank formed near its lower end, the double-armed lever resting on the axle and having its ends loosely connected to the frame, an opener-tooth, and a scraper or coverer, substantially as described.

In testimony whereof I affix my signature in presence of two witnesses.

JAMES LAFAYETT DYKES.

Witnesses:
J. B. CHRISTIAN,
R. H. WARE.